United States Patent [19]

Kristiansen

[11] 4,308,176

[45] Dec. 29, 1981

[54] CATALYST AND METHOD FOR PRODUCING SAID CATALYST

[75] Inventor: Leif A. Kristiansen, Porsgrunn, Norway

[73] Assignee: Norsk Hydro a.s., Oslo, Norway

[21] Appl. No.: 182,615

[22] Filed: Aug. 29, 1980

[30] Foreign Application Priority Data

Mar. 28, 1980 [NO] Norway .................................. 800905

[51] Int. Cl.³ ........................ B01J 21/04; B01J 23/06; B01J 23/72
[52] U.S. Cl. .................................................. 252/463
[58] Field of Search .......................... 252/463; 423/656

[56] References Cited

U.S. PATENT DOCUMENTS 3,303,001  2/1967  Dienes ............................. 252/475 X
3,388,972  6/1968  Reitmeier et al. ............... 252/463 X
3,787,332  1/1974  Sugier ............................. 252/459 X

FOREIGN PATENT DOCUMENTS 1131631  10/1968  United Kingdom ................ 423/656

*Primary Examiner*—W. J. Shine
*Attorney, Agent, or Firm*—Wenderoth, Lind & Ponack

[57] ABSTRACT

This invention relates to a catalyst and a method for producing said catalyst. At least 60 percent by weight of the catalyst consists of copper oxide, aluminum oxide-spinel and 60–100 percent of the copper present is bound to aluminum oxide as copper oxide, aluminum oxide-spinel, where the molar ratio Cu:Al=0.25–0.50. The catalyst itself contains 1–20 percent by weight of zinc oxide which is present in the pores of the spinel. Further amounts of zinc oxide may be admixed mechanically or be present as a coating on the catalyst tablets. The catalyst is especially well suited for conversion of carbon monoxide with steam to hydrogen. The catalyst is produced by precipitation of copper- and aluminum salts at pH=6.0–6.5 during addition of an ammonium carbonate solution. After filtration and drying, the product is calcined at 750°–850° C. until there is obtained a product having a 60–100 percent spinel structure. Zinc salt is introduced in the pores of the spinel, and the product thereby formed is heated up to at least the decomposition temperature for the zinc salt which is then converted to zinc oxide. Possible addition of zinc oxide in addition to that introduced into the pores of the spinel may be admixed mechanically.

6 Claims, No Drawings

CATALYST AND METHOD FOR PRODUCING SAID CATALYST

The present invention relates to a catalyst containing aluminium oxide and copper oxide. At least 60 percent by weight of this oxide mixture consists of a copper oxide, aluminium oxide compound with a spinel structure.

The invention also comprises a method for preparing the catalyst. Such catalysts are prepared by precipitation of metal salts, filtering, drying, calcining and tabletting.

Catalysts as described above are well suited for the conversion of carbon monoxide with steam to form hydrogen.

The conversion of carbon monoxide with steam is a well known process. By means of suitable catalysts, the reaction, usually called the CO-shift reaction, can be carried out at a temperature of about 200° C. according to the equation:

$$CO + H_2O \rightleftharpoons CO_2 + H_2$$

A number of catalsyts for this purpose are described in the literature. Such catalysts usually contain copper distributed in an oxide matrix. This matrix may consist of $Al_2O_3$, $Cr_2O_3$, ZnO and MnO, or a mixture of two or more of these components. The copper content is usually in the range of 20–40 percent by weight, and most of these catalysts make it possible to carry out the reaction at 200°–230° C.

A catalyst of this type is described in British Pat. No. 1,131,631.

It has been considered important to obtain the highest possible dispersion of the copper phase because this will lead to a large copper surface, and the tendency for sintering is reduced. According to the patent mentioned above, a good dispersion of copper is obtained by precipitating a slightly soluble product from a solution of copper-, aluminium- and zinc nitrates with a solution of sodium carbonate. The precipitated product consists of aluminum oxide and a mixed hydroxycarbonate of copper and zinc. The composition of this hydroxycarbonate depends on the conditions during precipitation. By heating to about 300° C. one obtains a product in which copper- and zinc oxide are present in a very intimate mixture. Because these two oxides have a low solubility in each other, they exist accordingly as separate phases. By reduction of this oxide mixture with hydrogen one obtains the active catalyst for the CO-shift reaction.

A number of patents, among others U.S. Pat. Nos. 3,303,001 and 3,388,972, describe preparation of catalysts by coprecipitation of copper-, zinc- and aluminium compounds. A catalyst with high initial activity is obtained from coprecipitation of aluminium hydroxide and copper hydroxycarbonate, and decomposition of the precipitate after drying at a temperature of 300°–400° C. However, this catalyst has been found to be less stable than the above described catalysts containing zinc oxide.

A catalyst of a somewhat different type is described in U.S. Pat. No. 3,787,332. This catalyst consists mainly of an oxide mixture of copper and at least one of the trivalent metals aluminium, manganese, iron and cobalt. At least 60 percent by weight of the oxide mixture has a spinel structure. The catalyst may also contain bivalent metals such as magnesium, cobalt and cadmium. This catalyst is prepared by mixing a solution of a copper salt and a solution of at least one of the trivalent metals. A gel-forming compound is added, and the gel is heated to at least 200° C. for decomposing the gel and forming the spinel. When preparing the copper oxide, aluminium oxide catalyst, the gel is heated to 650° for two hours. The catalyst is stated to have a high activity, and to be more stable than a catalyst with comparable composition, but without a spinel structure.

The disadvantage of this catalyst is that it is not resistant against chlorine- and sulphur contaminants and therefore requires a very clean gas mixture.

The zinc oxide containing catalysts referred to above are considerably more resistant to chlorine and sulphur fouling than the above described copper oxide, alumina oxide spinel catalyst. The lifetime of technical usage of these zinc containing catalysts is therefore longer than for the spinel catalyst, which on the other hand, can more easily be given a higher mechanical strength and is not weakened as much during application.

One purpose of the present invention was to develop a catalyst having an activity at least as high as the previously known catalysts, and which retains its activity for a longer time.

Another purpose was to prepare a catalyst which in addition to high activity and stability also was resistant against poisoning, particularly against chlorine in process gas.

Still another purpose was to prepare a catalyst where the active component has the highest possible dispersion in the catalyst.

Further it was a purpose to prepare a catalyst with improved mechanical properties.

For catalysts of the type described above for the CO-shift reaction, it has often been assumed that the active phase is metallic copper, and that the metal oxide phase only serves to separate the copper crystallites. The metals in the oxide phase are chosen in view of that assumption, and in order to obtain a compound between copper and the other metals in the precipitate. Thus by precipitating copper and zinc from their nitrates with sodium carbonate a slightly soluble copper, zinc-hydroxycarbonate is formed with a structure similar to malachite.

By precipitating a mixture of copper and aluminium compounds from their nitrate solutions with an ammonium- or sodium carbonate solution, two compounds are formed. One is an aluminium oxide with a water content depending on the conditions during precipitation. The other product is a copper-hydroxycarbonate with a structure similar to malachite. By suitable conditions during precipitation, these compounds can be made x-ray amorphous.

It is possible from this product to obtain a very active catalyst, but it is difficult to achieve the same stability as with a well formulated ZnO/Cu or $ZnO/Al_2O_3/Cu$ catalyst (for example those described in British Pat. No. 1,131,631).

In order to increase the stability of a catalyst based on copper oxide and aluminium oxide the inventor tried heating the above mentioned precipitate of copper and aluminium as recommended in U.S. Pat. No. 3,787,332. However, this did not give the product the expected increase in activity and stability. Furthermore, the product had an unexpected low content of spinel.

Surprisingly the inventor found that an unusually stable and active catalyst could be made by heating the above mentioned x-ray amorphous product to a higher temperature than that taught by U.S. Pat. No. 3,787,332. It also appeared that pellets made from this product could be given better mechanical properties than pellets from products such as those described in British Pat. No. 1,131,631 and U.S. Pat. No. 3,388,972.

Though it was possible in this way to obtain an active and stable catalyst, it did not have the required resistance against poisoning from chlorine and sulphur. It is well known that zinc oxide has a positive effect against such poisonings. But introducing zinc oxide by co-precipitating zinc-, copper- and aluminium salts before calcination will prevent formation of the copper oxide, aluminium oxide spinel. In fact, if zinc oxide is present during the calcination stage, a zinc aluminium oxide spinel will then primarily be formed and sintering of the copper oxide phase will simultaneously take place.

The inventor then tried to add zinc oxide to the copper oxide, aluminium oxide spinel. By addition of a zinc salt in a special way, a surprisingly high effect of the incorporated zinc oxide was obtained. That is, the spinel was first impregnated with an aqueous zinc salt solution and then heated to a temperature high enough to decompose the zinc salt to zinc oxide, giving a uniform distribution of the zinc oxide in the pores of the spinel.

A special advantageous way of carrying out the impregnation was to precipitate partly or completely the impregnated zinc salt by an aqueous ammonium carbonate solution.

For further protection of the catalyst against poisoning, it may be convenient to mix it mechanically with zinc oxide powder or to coat the pellets with zinc oxide. In some cases it has been found that it may be practical to add up to 15 percent by weight of zinc oxide in this way.

The special features of the catalyst according to the invention and the new method for preparing the catalyst, are defined in the present claims.

Thus, the present invention provides a catalyst comprising aluminum oxide and copper oxide wherein at least 60% by weight of this oxide mixture consists of a copper oxide, aluminum oxide compound having a spinel structure, 60-100% of the copper is bound to aluminum oxide as the copper oxide, aluminum oxide-spinel, the molar ratio Cu:Al is 0.25-0.50 in the spinel structure, and the catalyst contains zinc oxide in the pores of the spinel in an amount of 1-20% by weight calculated as zinc oxide, and optionally, the catalyst contains a further amount of zinc oxide admixed with the catalyst or coated on the catalyst.

Preferably, 90-100% by weight of the copper is bound to aluminum oxide as the copper oxide, aluminum oxide-spinel, and the catalyst contains 2-12% by weight of zinc oxide in the pores of the spinel.

The present invention also provides a method for preparing the catalyst, comprising mixing an aqueous solution of copper nitrate and aluminum nitrate with an aqueous solution of ammonium carbonate during adjustment of the pH of the mixture to 6.0-6.5, to form a suspension containing copper-hydroxide and/or copper-hydroxycarbonate, and aluminum-hydroxide, filtering the suspension, washing the filtered product, drying the washed product, calcining the dried product at 750°-850° C. until a product is obtained having 60-100% spinel structure, adding an aqueous zinc salt solution or a zinc salt melt to the spinel product, and heating the spinel product thus impregnated to at least the decomposition temperature of the zinc salt to convert the zinc salt to zinc oxide, and optionally, mixing a further amount of zinc oxide with the resultant product.

Preferably, the spinel product is impregnated with an aqueous zinc nitrate solution, the excess of said solution is then removed, the impregnated spinel product is dipped in an aqueous ammonium carbonate solution for complete or partial precipitation of zinc-hydroxycarbonate, the resultant product is washed, and the washed product is heated to at least the decomposition temperature of the zinc nitrate to form zinc oxide.

After the zinc salt is converted to zinc oxide, tabletting can be carried out.

The preparation and the advantages of this catalyst will be explained in more detail and demonstrated in the following examples and tables. The first example relates to the preparation of a dried precipitate, which is converted to a copper oxide, aluminum oxide spinel by thermal treatment as described in examples 2 and 6. The examples 3–5 and example 7 describe impregnation of products from example 2 and 6 respectively. The products thereby formed give catalysts according to the invention. Example 8 describes preparation of a known catalyst and this example is used for comparison.

EXAMPLE 1

This example shows the preparation of a dried copper, aluminium salt which is the starting material for the preparation of a copper oxide, aluminium oxide spinel. An aqueous solution of copper- and aluminium nitrate was made by dissolving 60.4 g $Cu(NO_3)_2.3H_2O$ and 187.5 g $Al(NO_3)_3.9H_2O$ per liter solution, such that the concentration of Cu and Al became 0.25 and 0.5 molar respectively. Another aqueous solution was made by dissolving 288 g $(NH_4)_2CO_3$ per liter solution. These two aqueous solutions were pumped to a vessel at such a relative rate that the pH in this vessel was maintained at 6.0–6.5.

The two solutions were introduced under constant stirring in the vessel, and the temperature was maintained at 20° C. By maintaining these conditions a light blue precipitate was formed, which was filtered off and washed with water to make the $NH_4NO_3$ content in the dried product less than 5 percent by weight. The product was then dried at 80°–90° C. until the remaining content of moisture was below 25 percent and then the product was crushed to a particle size less than 0.5 mm.

EXAMPLE 2

The product from example 1 was heated in air to a temperature of 550° C. for one hour, and then cooled to room temperature. Then 3 percent by weight of graphite was added and the product was shaped in a tabletting press to form cylindrical tablets with diameter and height of 5 mm. The cylindrical tablets were then calcined at 825° C. for 30 minutes. This thermal treatment led to the formation of the $Al(CU,Al)O_4$-spinel as detected by x-ray diffraction. 75 percent of the copper was bound to the aluminium oxide in the spinel, which had a molar ratio Cu:Al=0.38. The total content of copper was 33 percent by weight. This product is designated as product A.

EXAMPLE 3

Product A from example 2 was impregnated with $Zn(NO_3)_2$ by dipping it in an aqueous 3 molar $Zn(NO_3)_2$-solution. Subsequent to the impregnation the product was heated to 350° C., whereby the zinc nitrate decomposed to ZnO. The impregnated product had a content of ZnO of 11 percent by weight, i.e. 9.1 percent by weight of Zn. This product is designated product B.

EXAMPLE 4

Product A from example 2 was first impregnated by zinc nitrate in the same way as in example 3. The impregnated product was then dipped in a 1 molar NH4HCO3-solution and kept there for about 5 minutes. Subsequent to this treatment the product was heated to 350° C. for formation of zinc oxide.

This product had a content of ZnO of 8 percent by weight, i.e. 6.5 percent by weight Zn, and 75% of the copper was bound to the aluminium oxide in the spinel. This product is designated product C.

EXAMPLE 5

Product A was impregnated by dipping it in melted Zn(NO3)2.6H2O at 60° C. and was then heated to 350° C. for formation of zinc oxide. This product had a content of ZnO of 4 percent by weight and is designated product G.

EXAMPLE 6

A sample of the product from example 1 was heated directly to 825° C. without subsequent tabletting and kept at this temperature for 60 minutes. After this heating step the product was tabletted to form tablets of the same size as in example 2. 95% of the copper was bound to aluminium oxide in the spinel which had a molar ratio Cu:Al=0.47. The total content of copper was 33 percent by weight. This product is designated product D.

EXAMPLE 7

Product D was impregnated and heated to 350° C. in the same way as described in example 4, whereby a product was formed containing 8 percent by weight of ZnO. The molar ratio Cu:Al and the percentage of copper bound in the spinel was the same as in example 6. This product is designated product E.

EXAMPLE 8

This example shows the preparation of a conventional CO-shift catalyst prepared by co-precipitation of zinc-, copper- and aluminium salts.

An aqueous solution of copper-, zinc- and aluminium nitrate was prepared by dissolving 40.3 g Cu(NO3)2.3H2O, 59.8 g Zn(NO3)2.6H2O 62.5 g Al(NO3)3.9H2O to a volume of 1 liter.

Another aqueous solution was prepared by dissolving 96 g of (NH4)2CO3 to a volume of 1 liter. These two solutions were pumped to a vessel in such relative amounts that the pH in the vessel became 6.0-6.5.

The two solutions were supplied during constant stirring in the vessel where the temperature was kept at 20° C. When the above stated conditions were observed, a light blue precipitate was formed and it was separated by filtration and washed with water until the content of NH4NO3 in the dry product was below 5 percent by weight. The product was then dried at 80°-90° C. until the remaining moisture was below 25 percent by weight and it was then crushed to particles less than 0.5 mm.

After having been crushed, the particles were heated to 350° C. and kept at this temperature for one hour. The particles were tabletted in the same way as in example 2. The resulting tablets are designated product F.

The products A-G were used as catalysts during conversion of carbon monoxide with steam.

Before the conversion itself, the catalyst was reduced according to known procedure by heating it in a hydrogen atmosphere having a hydrogen pressure of about 200 kPa. The temperature was increased by 30° C. per hour until the temperature reached 250° C. and this temperature was maintained for 3 hours.

The conditions during the conversions are listed in the respective tables.

The catalyst activity was measured in two different scales. For the results referred to in tables I and II, 1 liter of catalyst was placed in a tubular reactor having an inner diameter of 38 mm. The CO-containing gas was drawn from a technical ammonia plant and the gas was drawn from a point positioned after the high temperature shift converter. This gas contained trace amounts of chlorine.

For the results referred to in tables III and IV, a tubular reactor having an inner diameter of 5.5 mm was used. This reactor was filled with 50 cylindrical catalyst tablets having a diameter of 5 mm and a height of 5 mm, and between each tablet there was placed a 5 mm glass sphere. A highly purified gas, consisting of 95% nitrogen and 5% carbon monoxide, and water vapour (steam) were passed through this catalyst layer. Water was added in liquid form and vapourized under pressure. Hydrogen chloride was added to the water to a concentration of 0.005 mol HCl/liter such that the process gas thereby contained about 1.5-1.6 ppm HCl during the test.

The water present in the gas was removed before the gas was analyzed at the inlet and outlet of the reactor. The percentage carbon monoxide converted was calculated according to the following equation:

$$\% \text{ reacted CO} = \frac{\text{vol. \% CO at the inlet} - \text{vol. \% CO at the outlet}}{\text{vol. \% CO at the inlet}} \cdot 100$$

In the tables the degree of conversion with respect to CO is given for the different products (A-G) as a function of the period of operation in hours.

TABLE I

ACTIVITY TEST

| Catalyst | % CO conversion | | | | |
|---|---|---|---|---|---|
| | 0 hours | 120 hours | 240 hours | 360 hours | 480 hours |
| D | 85 | 72 | 60 | 50 | 40 |
| F | 85 | 72 | 66 | 55 | 54 |

Test conditions:
Pressure: 24 bar, Temperature: 215° C., Space velocity: 1266 h$^{-1}$
gas composition at the reactor inlet: (vol. %):
CO: 1.0–1.2%, $CO_2$: 16–17%, $H_2O$: 41–44%, $N_2$: 17–18%, $H_2$: 51–53%.

TABLE II

ACTIVITY TEST

| Catalyst | % CO conversion | | | | | |
|---|---|---|---|---|---|---|
| | 0 hours | 120 hours | 240 hours | 480 hours | 720 hours | 960 hours |
| C | 82 | 82 | 82 | 82 | 82 | 82 |
| F | 74 | 65 | 62 | 62 | 62 | 62 |

Test conditions:
Pressure: 15 bar, Temperature 217° C., Space velocity: 2026 h$^{-1}$
Gas composition at the reactor inlet (vol. %):
CO: 1.5–1.6, $CO_2$: 12–13, $H_2O$: 30–35, $N_2$: 13–14, $H_2$: 41–42.

TABLE III

ACTIVITY TEST

| Catalyst Type | Amount in grams | % CO conversion | | | | | | |
|---|---|---|---|---|---|---|---|---|
| | | 0 hours | 10 hours | 20 hours | 30 hours | 40 hours | 50 hours | 3 hours |
| A | 4.37 | 98 | 97 | 95 | 87 | 60 | 43 | 87 |
| C | 4.79 | 98 | 98 | 98 | 96 | 93 | 92 | 93 |
| D | 4.17 | 98 | 95 | 93 | 80 | 50 | 20 | 86 |
| E | 4.47 | 98 | 98 | 96 | 96 | 92 | 88 | 90 |
| F | 6.55 | 90 | 82 | 80 | 78 | 63 | 61 | 60 |

Test conditions:
Pressure: 10 bar, Temperature 180° C., Gas load: 1500 Ncm$^3$/min
Gas composition at the reactor inlet (vol. %):
CO: 2.85%, N$_2$: 54.28%, H$_2$O: 42.85%, HCl: 1.5–1.6 ppm
$^x$Gas load: 3000 Ncm$^3$/min Content of zinc in percent by weight of the catalysts C, E and F were 6.5%, 6.4% and 25.7% respectively.

Calculated on basis of the contents of copper oxide-aluminum oxide, 93% is converted to spinel structure for the catalysts A and C, and correspondingly, 98.5% for the catalysts D and E.

TABLE IV

ACTIVITY TEST

| Catalyst Type | Amount in grams | % CO conversion | | | |
|---|---|---|---|---|---|
| | | 0 hours | 10 hours | 30 hours | 60 hours |
| C | 4.71 | 96 | 95 | 94 | 94 |
| B | 5.24 | 84 | 82 | 75 | 75 |
| G | 5.50 | 86 | 75 | 62 | 58 |

Test conditions:
The same conditions as for table III.
The contents of zinc as Zn in the catalysts C, B and G were respectively 6.5 9.1 and 3.2 percent by weight.

TABLE V

MECHANICAL PROPERTIES

| Properties | Catalyst | | | |
|---|---|---|---|---|
| | D | D$^x$ | F | F$^x$ |
| Tablet height (mm) | 4.0 | 4.0 | 4.6 | 4.4 |
| Tablet diam. (mm) | 5.1 | 5.1 | 5.1 | 4.9 |
| Tablet density (g/cm$^3$) | 1.83 | 1.82 | 1.48 | 1.44 |
| Breaking strength$^{xx}$ | 4.0 | 2.0 | 7.4 | 0.2 |
| Change in weight (%) | | −2 | | −19 |
| Change in volume (%) | | −0.4 | | −10 |

$^x$Measured after the catalyst was removed from the reactor.
$^{xx}$Load (kp) against the cylinder wall of the tablets necessary for crushing them.

Change in volume is due to shrinkage of the tablets. The linear shrinkage was about 4% for F which gives a volumetric shrinkage of 10–12% or −10 as stated in the table.

Tables I and III show that catalysts of type A and D are not stable when the process gas contains chlorine. The chlorine content of the gas used for the tests described in tables I and II is not known. The amount of HCl present in the water supplied in the test shown in table III gives a chlorine content in the process gas of about 1.6 ppm. This is substantially higher than what is the case for tables I and II.

Tables II and III show that a substantially more stable catalyst (product C and E) is obtained when zinc oxide is added to the copper oxide, aluminium oxide-spinel catalyst. The initial activity is also higher for such a catalyst than for a catalyst without zinc oxide. This was proved by doubling the gas load for the test shown in table III, and this increase in gas load was done about 3 hours after the test started. The results are shown in the last column of table III.

In table V are shown some physical data for the catalysts used during the tests described in tables I and II. In table V we will especially emphasize the difference in mechanical strength for the products D and F. This strength is high for both types of catalysts before the test. After 500 hours of operation the reactors were opened and the catalysts were examined.

For product F a loss in weight of 20% was found, while the loss of weight for product D was about 2%. A difference axially along the reactors was also observed. It is assumed, although it is not certain, that the reason for this large difference of the mechanical stability of the catalyst is that the binding forces in the pellets are related to the content of zinc oxide in product F while this is not the case for product D. Formation of a liquid zinc chloride phase for product F will result in substantial weakening of these forces. This explains the large difference in mechanical strength axially in the reactor filled with catalyst F. There is not observed any difference between catalysts of type A and D without zinc oxide and of the type C and D with zinc oxide regarding mechanical properties. The zinc oxide present in catalyst C will not take part in binding the pellet together because it was added to the already formed pellet. Even if a liquid zinc oxide phase should be formed in this product, it would therefore not lead to a substantially weakening of the pellet.

The results in table IV show that it is significant how the zinc oxide is added to the catalyst.

As shown in table III, the catalysts A and C–E have higher initial activity than the known catalyst F. When technical reaction gas (table II) is used, the catalyst C according to the invention maintains its high activity while catalyst F shows a significant drop in activity after a short period of operation, and then it stays at a fairly constant level. When reaction gas having a relatively high content of chlorine is used (table III), the known catalyst F gets approximately the same drop in activity as in technical gas. Contrary to this the catalysts C and E, according to the invention, maintain their high activity even when chlorine is present in the reaction gas. The activity of catalysts A and D, which contain no zinc oxide, get a significant drop in activity in gas containing chlorine. Accordingly catalysts C and E have a higher activity than the known catalyst F and are at least as resistant as catalyst F with regard to chlorine poisoning.

Further, the catalysts according to the invention have at least as high activity as the catalysts according to U.S. Pat. No. 3,787,382. This is based on the information given in the patent. Additionally, the catalysts of type C and E are substantially more resistant to chlorine poisoning than the known catalyst.

The most essential features of the catalyst according to the invention are that it comprises a copper oxide, aluminium oxide-spinel, that 60–100% of the copper present is bound to aluminium oxide as copper oxide, aluminium oxide-spinel and that the zinc oxide of the catalyst exists in the pores of the spinel.

Even if it is advantageous that as much as possible of the copper is bound in the copper oxide, aluminium oxide-spinel, it has been found that also when only 60% of the copper is bound in this way, an excellent catalyst is obtained. The molar ratio Cu:Al is not very critical as long as it is within the range 0.25-0.50. Regarding the content of zinc oxide in the catalyst, it has been found that even as little as 1 weight percent zinc oxide in the pores of the spinel gives a positive effect. How much zinc oxide there should be in the pores of the spinel depends on practical conditions and the content of contaminants in the gas in which the catalyst shall be used. It has been found that up to 20 weight percent zinc oxide in the pores of the spinel can be advantageous in certain cases.

The most essential feature of the method is the precipitation of the copper- and aluminium salts at pH 6.0-6.5, the calcination step for obtaining a good spinel structure and finally the incorporation of zinc oxide in the pores of the spinel.

As shown in the above examples and table IV, it is not only the content of copper and zinc in the catalyst which are decisive of its activity and lifetime. It is also critical in which form the components are present in the catalysts.

Also regarding mechanical properties, it has been found (table V) that the catalysts C and E according to the invention, are better than the known catalyst F. Such a great loss of catalyst mass as observed during the test for catalyst F can lead to increasing pressure drop in a technical reactor, and it can also lead to channeling of the gas through the catalyst layer (bed). This means that it may be necessary to replace the catalyst after a relatively short period of operation, even though the catalyst as such has an acceptable high activity. For the catalyst C and E, which have substantially better mechanical properties, replacement for this reason will not be necessary.

I claim:

1. A catalyst comprising aluminum oxide and copper oxide wherein at least 60% by weight of this oxide mixture consists of a copper oxide, aluminum oxide compound having a spinel structure, 60-100% of the copper is bound to aluminum oxide as the copper oxide, aluminum oxide-spinel, the molar ratio Cu:Al is 0.25-0.50 in the spinel structure, and the catalyst contains zinc oxide in the pores of the spinel in an amount of 1-20% by weight calculated as zinc oxide, and optionally, the catalyst contains a further amount of zinc oxide admixed with the catalyst or coated on the catalyst.

2. A catalyst according to claim 1, wherein 90-100% by weight of the copper is bound to aluminum oxide as the copper oxide, aluminum oxide-spinel, and the catalyst contains 2-12% by weight of zinc oxide in the pores of the spinel.

3. A method for preparing a catalyst according to claim 1 or 2, comprising mixing an aqueous solution of copper nitrate and aluminum nitrate with an aqueous solution of ammonium carbonate during adjustment of the pH of the mixture to 6.0-6.5, to form a suspension containing copper-hydroxide and/or copper-hydroxycarbonate, and aluminum-hydroxide, filtering the suspension, washing the filtered product, drying the washed product, calcining the dried product at 750°-850° C. until a product is obtained having a 60-100% spinel structure, adding an aqueous zinc salt solution or a zinc salt melt to the spinel product, and heating the spinel product thus impregnated to at least the decomposition temperature of the zinc salt to convert the zinc salt to zinc oxide, and optionally, mixing a further amount of zinc oxide with the resultant product.

4. A method according to claim 3, wherein the spinel product is impregnated with an aqueous zinc nitrate solution, the excess of said solution is then removed, the impregnated spinel product is dipped in an aqueous ammonium carbonate solution for complete or partial precipitation of zinc-hydroxy-carbonate, the resultant product is washed, and the washed product is heated to at least the decomposition temperature of the zinc nitrate to form zinc oxide.

5. A method according to claim 3, further comprising tabletting the product after the zinc salt is converted to zinc oxide.

6. A method according to claim 4, further comprising tabletting the product after the zinc nitrate is converted to zinc oxide.

* * * * *